United States Patent
Chou et al.

(10) Patent No.: US 10,148,994 B2
(45) Date of Patent: Dec. 4, 2018

(54) MIRROR TRANSMISSION METHOD

(71) Applicant: BARCO LIMITED, New Taipei (TW)

(72) Inventors: Kuan-Yu Chou, New Taipei (TW);
Shih-Ping Liu, New Taipei (TW);
Cheng-Hsiung Chang, New Taipei (TW); Yen-Hsiang Wang, New Taipei (TW); Chia-Chen Kuo, New Taipei (TW)

(73) Assignee: BARCO LIMITED, New Taipei (TW)

( * ) Notice: Subject to any disclaimer, the term of this patent is extended or adjusted under 35 U.S.C. 154(b) by 187 days.

(21) Appl. No.: 15/059,823

(22) Filed: Mar. 3, 2016

(65) Prior Publication Data
US 2016/0286257 A1    Sep. 29, 2016

(30) Foreign Application Priority Data
Mar. 23, 2015 (TW) .................... 104109199

(51) Int. Cl.
| H04N 21/41 | (2011.01) |
| H04N 21/439 | (2011.01) |
| H04N 21/4363 | (2011.01) |
| H04N 21/43 | (2011.01) |
| H04N 21/442 | (2011.01) |

(52) U.S. Cl.
CPC ..... *H04N 21/4122* (2013.01); *H04N 21/4307* (2013.01); *H04N 21/439* (2013.01); *H04N 21/43637* (2013.01); *H04N 21/44227* (2013.01)

(58) Field of Classification Search
None
See application file for complete search history.

(56) References Cited

U.S. PATENT DOCUMENTS

| 2005/0174489 A1 | 8/2005 | Yokoyama et al. |
| 2012/0162536 A1 | 6/2012 | Sibilsky et al. |
| 2015/0189498 A1* | 7/2015 | Chen .............. H04W 76/023 455/420 |
| 2016/0219606 A1* | 7/2016 | Amano ............ H04N 1/00217 |

FOREIGN PATENT DOCUMENTS

| CN | 104105000 A | 10/2014 |
| TW | 200947947 A | 11/2009 |
| TW | 201145231 A1 | 12/2011 |

OTHER PUBLICATIONS

Office Action dated Dec. 9, 2015 of the Corresponding Taiwan Patent Application No. 104109199.

* cited by examiner

Primary Examiner — Kumar Patel
Assistant Examiner — Amen Bogale
(74) Attorney, Agent, or Firm — Chun-Ming Shih; HDLS IPR Services

(57) ABSTRACT

A mirroring transmission method is provided. The present method retrieves image frames and audio signals of a transmitter and transmits the retrieved image frames and retrieved audio signals to a receiver to be displayed wirelessly. In the meantime, the present method monitors status of a network connected with the transmitter and the receiver, and determines if the network is stable or not. Also, the method stops retrieving and transmitting the audio signal from the transmitter to the receiver, and controls the transmitter to display the audio signal directly through an internal audio module whenever the network is determined unstable.

11 Claims, 6 Drawing Sheets

MIRROR TRANSMISSION METHOD

TECHNICAL FIELD

The present invention relates to wireless transmission and more particularly relates to mirror transmission method.

BACKGROUND

Recently, variable portable electronic devices like smart phones and tablets have great market success and enter today life of many people. Many users now get used to use such portable electronic devices to replace traditional desktop computers or laptop computers and use these portable electronic devices to store, edit and play large size multimedia files.

These portable electronic devices are convenient to be carried by users and provide multimedia file playing at any place. However, to fit the portability convenience, such portable electronic devices usually have smaller displays. Therefore, when enjoying multimedia files stored in such portable electronic devices, many users use mirror transmission function to send images and audio wirelessly to electronic devices with larger displays. Examples of such products include Chromecast of Google or Apple TV of Apple Inc.

The aforementioned mirror transmission function is mainly based on using a wireless network connecting a transmitter electronic device like a mobile phone and a receiver electronic device like a smart television to retrieve image frames of the transmitter electronic device to be played on the receiver electronic device. Therefore, when the bandwidth of the wireless network is insufficient or a surge occurs, data transmission may be unstable.

Specifically, in current mirror transmission technology, when bandwidth is insufficient or a surge occurs, causing unstable wireless network, the audio signal at the receiver electronic device may be non-continuous and even may have shock-wave noise and thus may make users to feel uncomfortable.

Besides, when the wireless network lacks sufficient bandwidth or has a surge problem, the receiver electronic device may fail to synchronously display as the transmitter electronic device when failing to receive image frames continuously. When the status of the wireless network is recovered, the receiver electronic device may receive lots of previously unsuccessfully transmitted image frames and play these image frames immediately to show images rapidly. As such, it may affect people to use transmission technology if they cannot get normal images and audio at the receiver electronic device.

SUMMARY OF INVENTION

An objective of the present invention is to provide a mirror transmission method that changes the approach of retrieving audio data played at the transmitter electronic device and sending the audio data to the receiver electronic device to be played to decrease transmission amount when the network is unstable. Meanwhile, the present invention avoids non-continuous audio signal or shock-wave noises being received at the receiver electronic device.

To achieve the aforementioned objective, the present invention provides a mirror transmission method for retrieving image frames and audio signals from a transmitter electronic device and sending the image frames and the audio signals to a receiver electronic device to be played.

Meanwhile, in the present invention, the network status is continuously monitored. When the network status is unstable, the method stops retrieving and transmitting audio signals of the transmitter electronic device to the receiver electronic device and controls audio signals to be directly played by an audio module of the transmitter electronic device.

Compared with conventional technology, such method has technical effect including that by stopping retrieving and transmitting audio signals of the transmitter electronic device to the receiver electronic device and controlling the audio to be played directly by the transmitter electronic device, users may get correct audio signals at the transmitter electronic device instead of hearing non-continuous audio or shock-wave noises due to unstable network at the receiver electronic device which causes abnormal mirror transmission.

Besides, when the network is unstable, the parameters for retrieving the image frames at the transmitter electronic device and for transmitting image frames to the receiver electronic device may be adjusted to largely decrease data transmission amount of the transmission electronic device. This solves the problem when the data transmission amount is too large or when surge occur causing unsuccessful mirror transmission.

DETAILED DESCRIPTION

A preferred embodiment is explained as follows with associated drawings.

Figure 1:
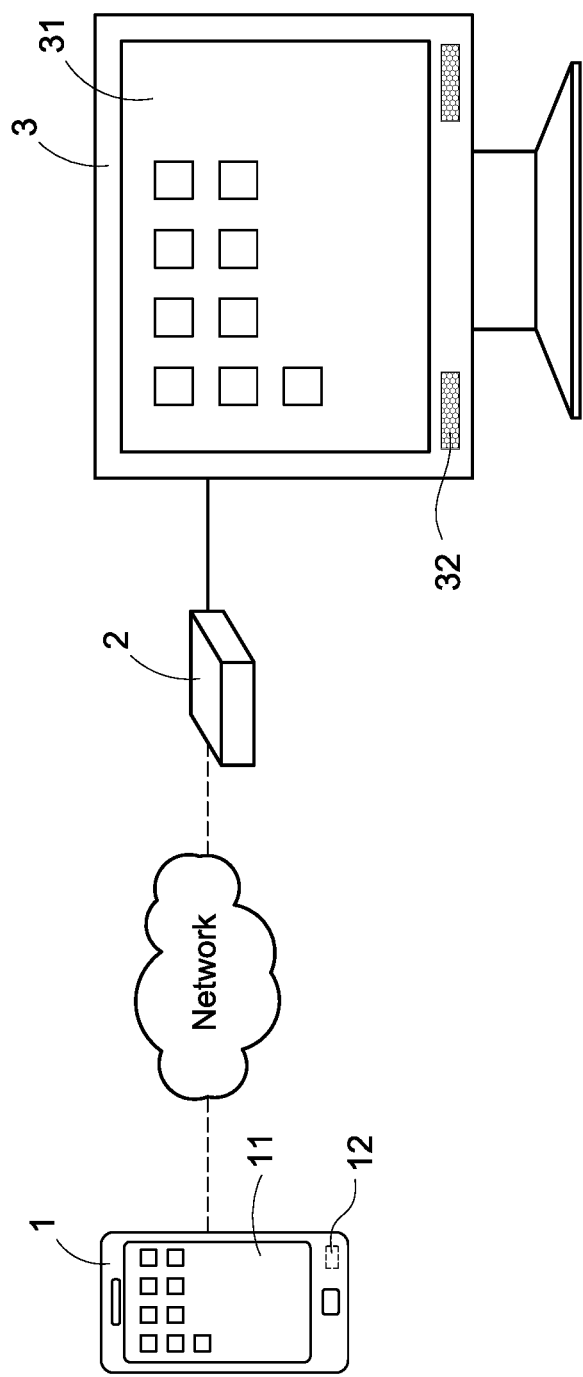
FIG. 1 is a system schematic diagram of a first embodiment according to the present invention.
Figure 2:
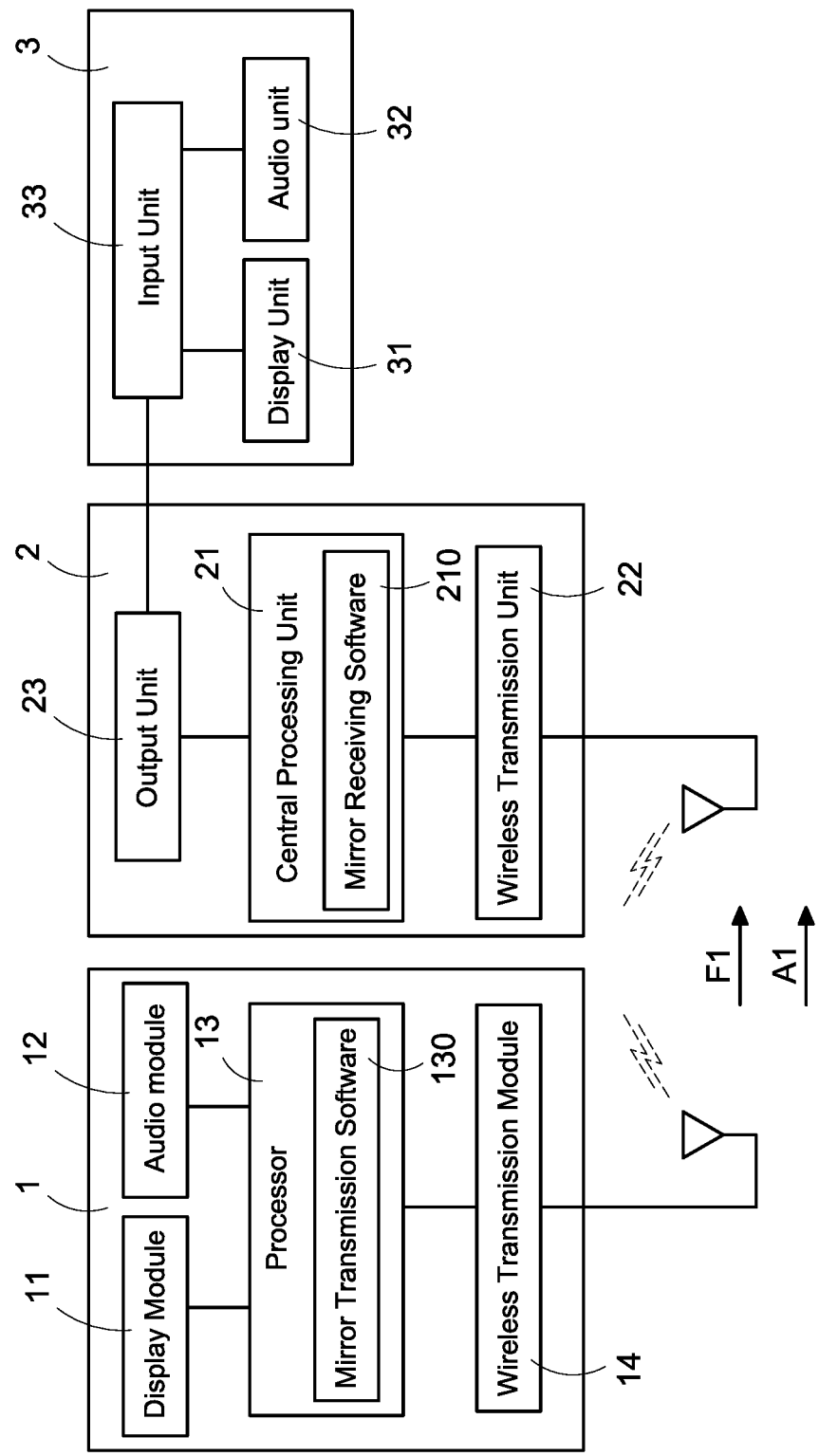
FIG. 2 is a system block diagram of the first embodiment according to the present invention.

Please refer to FIG. 1, which is a system schematic diagram of a first embodiment according to the present invention. A mirror transmission method is disclosed to be used between a transmitter electronic device 1 and a receiver electronic device 2. The transmitter electronic device 1 and the receiver electronic device 2 are wirelessly connected with a network. When the mirror transmission method is executed, the mirror transmission method retrieves an image frame F1 that is originally to be displayed by a display module 11 at the transmitter electronic device 1 and retrieves an audio signal A1 that is originally to be played by an audio module 12 at the transmitter electronic device as illustrated in FIG. 2. Besides, the retrieved image frame F1 and the audio signal A1 are wirelessly transmitted to the receiver electronic device 2 to be played remotely.

Please be noted that when the mirror transmission method is executed, the transmitter electronic device 1 stops its audio module 12 to play the audio signal A1 so that users may fail to hear the audio signal A1 from the audio module 12. Besides, the transmitter electronic device 1 may be configured so that its display module 11 stops displaying the image frame F1 to save power or continuously displays the image frame F1 synchronously as the receiver electronic device 2.

In the embodiment of FIG. 1, the receiver electronic device 2 is electrically connected to an external display device 3. The display device 3 has a display unit 31 and an audio unit 32. The display unit 31 has a larger display size than the display module 11 of the transmitter electronic device 1. After the receiver electronic device 2 wirelessly receives the image frame F1 and the audio signal A1 transmitted from the transmitter electronic device 1, the image frame F1 and the audio signal A1 are directly transmitted to the display device 3 to be displayed by the display unit 31 and the audio unit 32.

In another embodiment, the receiver electronic device 2 may embedded the display unit 31 and the audio unit 32 internally. In other words, the receiver electronic device 2 and the display device 3 are integrated together. However, the invention scope does not limit any of such setting.

Please refer to FIG. 2 at the same time. FIG. 2 is a system block diagram of the first embodiment according to the present invention. As shown in FIG. 2, in this embodiment, the transmitter electronic device 1 mainly has the display module 11, the audio module 12, a processor 13 and a wireless transmission module 14. The processor 13 is electrically connected to the display module 11, the audio module 12 and the wireless transmission module 14. The processor 13 stores a mirror transmission software 130.

In this embodiment, the transmitter electronic device 1 executes the mirror transmission software 130 with the processor 13 and continuously retrieves images displayed on the display module 11 like desktop images of the transmitter electronic device 1 or images based on a multimedia file and retrieves audio to be played by the audio module 12. Next, the retrieved image frame F1 and the audio signal A1 are processed by the mirror transmission software 130 and then wirelessly transmitted to the corresponding receiver electronic device 2 via the wireless transmission module 14.

As illustrated in FIG. 2, the receiver electronic device 2 mainly has a central processing unit 21, a wireless transmission unit 22 and an output unit 23. The central processing unit 21 is electrically connected to the wireless transmission unit 22 and the output unit 23 and stores a mirror receiving software 210. The receiver electronic device 2 uses the central processing unit 21 to execute the mirror receiving software 210 and after the mirror receiving software 210 is executed, the receiver electronic device 2 may establish a connection with the transmission electronic device 1.

In this embodiment, the receiver electronic device 2 keeps the connection with the transmitter electronic device 1 when the mirror receiving software 210 is executed and continuously receives the image frame F1 and the audio signal A1 transmitted by the transmitter electronic device 1. The receiver electronic device 2 uses the mirror receiving software 210 to process the received image frame F1 and the received audio signal A1 and uses the output unit 23 to output to the display device 3 connected to the receiver electronic device 2. Please be noted that if the receiver electronic device 2 and the display device 3 are integrated as a body, the output unit 23 may not be necessary.

As illustrated in FIG. 2, the display device 3 may be a smart television. The smart television includes an input unit 33, the display unit 31 and the audio unit 32, and the input unit 33 is electrically connected to the display unit 31 and audio unit 32. Please be noted that if the display unit 3 and the receiver electronic device 2 are integrated as a body, the input unit 33 may not be necessary. The display unit 31 and the audio unit 32 are integrated inside the receiver electronic device 2 and electrically connected to the central processing unit 21. However, such setting is only for illustration and the invention scope is not limited to these examples.

The display device 3 uses the input unit 33 to be electrically connected to the output unit 23 of the receiver electronic device 2 for receiving the image frame F1 and the audio signal A1 from the receiver electronic device 2 and uses the display unit 31 to display the received image frame F1 and the audio unit 32 to play the received audio signal A1. As such, users may wirelessly transmit video and audio of the transmitter electronic device 1 to the receiver electronic device 2 or the display device 3 to be played for achieving mirror transmission and to gain corresponding technical effect.

Figure 3:
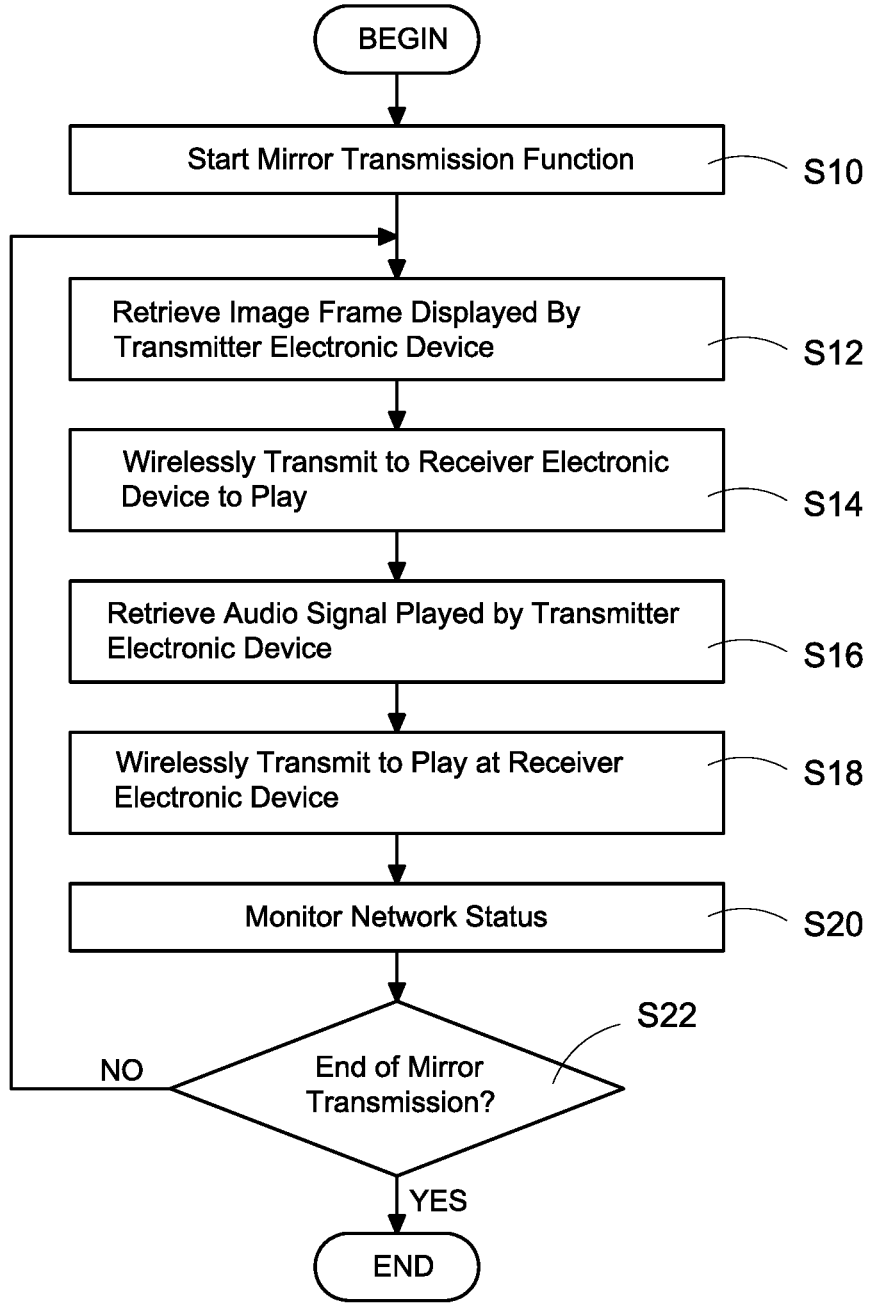
FIG. 3 is a transmission flowchart of the first embodiment according to the present invention.

Please refer to FIG. 3, which is a transmission flowchart of a first embodiment according to the present invention. To implement the mirror transmission method of the present invention, a mirror transmission function needs to be activated (step S10). Specifically, the mirror transmission software 130 and the mirror receiving software 210 are executed to establish the connection between the transmitter electronic device 1 and the receiver electronic device 2 to activate the mirror transmission function. However, this is only explained as an example, instead of limiting the invention scope.

After the step S10, the transmitter electronic device 1 uses the mirror transmission software 130 to retrieve the image frame F1 displayed on the display module 11 (step S12) and uses the wireless transmission module 14 to wirelessly transmit the image frame F1 to the receiver electronic device 2 to be displayed (step S14). Meanwhile, the transmitter electronic device 1 also uses the mirror transmission software 130 to retrieve the audio signal A1 of the audio module 12 (step S16) and uses the wireless transmission module 14 to wirelessly transmit the audio signal A1 to the receiver electronic device 2 to be played (step S18).

Please be noted that in the embodiment, the transmitter electronic device 1 and/or the receiver electronic device 2 continuously monitors the status of the network (step S20) to determine whether to change current mirror transmission approach (to be further explained later). Besides, the transmitter electronic device 1 or the receiver electronic device 2 also continuously determines whether the mirror transmission function is turned off (step S22). For example, the mirror transmission software 130 or the mirror receiving software 210 is determined whether being turned off or the connection between the transmitter electronic device 1 and the receiver electronic device 2 being disconnected. Besides, steps between the step S12 to the step S20 are continuously executed before the mirror transmission function is turned off to continuously retrieve the image frame F1 and the audio signal A1 and to wirelessly transmit the retrieved image frame F1 and the retrieved audio signal A1 to the receiver electronic device 2 to achieve mirror transmission.

Figure 4:
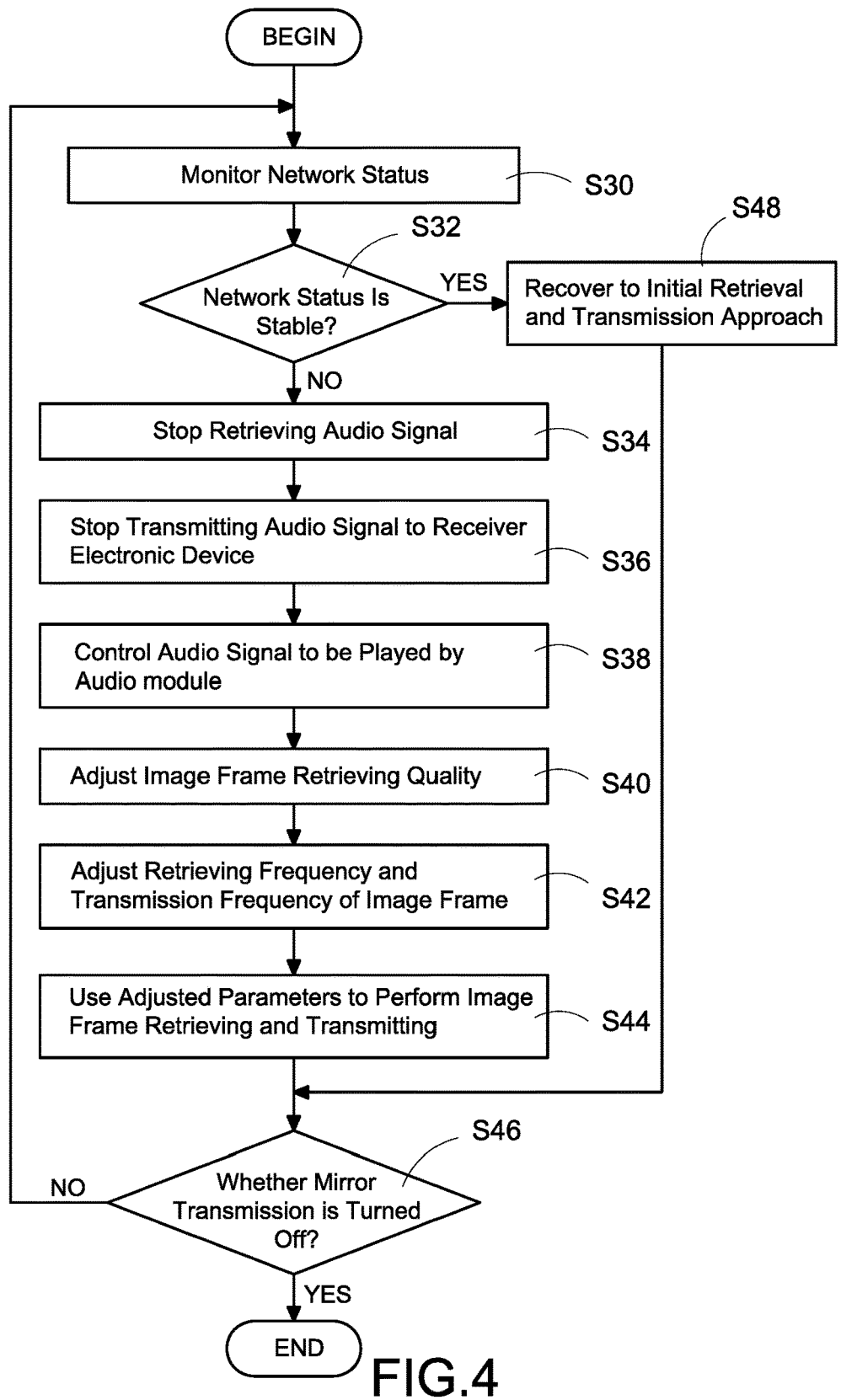
FIG. 4 is a transmission flowchart of a second embodiment according to the present invention.

Please refer to FIG. 4, which is a transmission flowchart of a second embodiment according to the present invention. In this embodiment, the transmitter electronic device 1 and/or the receiver electronic device 2 continuously monitors the status of the network (step S30) and determines whether the status of the network is stable according to monitored data (step S32). In this embodiment, when the network is determined unstable, the transmitter electronic device 1 stops retrieving the audio signal A1 (step S34) and stops transmitting the audio signal A1 to the receiver electronic device 2 (step S36). In addition, the audio signal A1 is controlled to be played directly with the audio module 12 (step S38).

Specifically, in this embodiment, when the network is determined unstable, the mirror transmission software 130 is controlled to stop retrieving the audio signal A1 from the transmitter electronic device 1 and sending the audio signal A1 externally. Besides, the transmitter device 1 is controlled to play the audio signal A1 with its own audio module 12 like a speaker. As such, when the network status is unstable under which condition the audio signal A1 is not able to be smoothly and fluently transmitted via the network, the audio signal A1 is not sent to the receiver electronic device 2, so the event that the audio is played non-continuously at the receiver electronic device 2 or generates shock-wave noises can be avoided.

On the other hand, if the network status is determined unstable in the step S32, the transmitter electronic device 1 may adjust a retrieving quality of the mirror transmission software 130 for retrieving the image frame F1 (step S40) and meanwhile adjust a retrieving frequency for retrieving the image frame F1 from the display module 11 and a transmission frequency for transmitting the image frame F1 (step s42). Besides, the mirror transmission software 130 uses adjusted parameters, i.e. one of adjusted retrieving quality, adjusted retrieving frequency and adjusted transmission frequency, to perform retrieving and transmission of the image frame F1 (step S44). As such, by lowering data transmission amount with the transmitter electronic device 1, the receiver electronic device 2 can receive the image frame F1 precisely and synchronously plays the image frame F1 as the transmitter electronic device 1.

Please be noted that steps from the step S34 to the step S38 are directed to adjustment of retrieval and transmission approach of the audio signal A1. Steps from the step S40 to the step S44 are directed to adjustment of retrieval and transmission approach of the image frame F1. However, the steps from the step S34 to the step S38 and the steps from the step S40 to the step S44 do not have necessary order to be executed. Besides, the mirror transmission software 130 may only adjust retrieval and transmission approach of the audio signal A1 or the image frame F1, instead of adjusting both of them. Such example should not be regarded limitation to the invention scope.

As illustrated in FIG. 4, during mirror transmission, the transmitter electronic device 1 and/or the receiver electronic device 2 continuously monitors whether the mirror transmission function being turned off (step S46) and continuously monitors the network status before the mirror transmission function is turned off (step S30). The mirror transmission method is terminated after the mirror transmission function is turned off.

In this embodiment, when the network status is unstable, e.g. insufficient bandwidth or with surge, the mirror transmission software 130 uses the aforementioned steps S34 to S44 to adjust the retrieving and the transmission of the image frame F1 and the audio signal A1 to solve the problems of non-continuous audio, shock-wave noises and unable to play synchronously at the receiver electronic device 2. Besides, when the network status is determined being recovered stable in the step S32, the mirror transmission software 130 is recovered to initial retrieving and transmission approach (step S48). In other words, the audio signal A1 is retrieved again and transmitted to the receiver electronic device 2 to be played and recover the retrieving quality, the retrieving frequency and the transmission frequency to initial values.

Please be noted that the aforementioned retrieving quality may refer to the resolution of the image frame F1 retrieved by the mirror transmission software 130. For example, if the resolution of the images currently displayed by the display module 11 is 1920×1080, the mirror transmission software 130 retrieves the image frame F1 with the resolution of 1920×1080 directly if the network status is stable. On the other hand, if the network status is unstable, to decrease data transmission amount, the mirror transmission software 130 may change to use 1280×720 or even 640×480 resolution to retrieve the image frame F1 after the step S40 to largely decrease the data transmission amount of the transmitter electronic device 1, and to decrease the network burden so as to recover the network to stable status quickly.

Besides, the aforementioned retrieving frequency and the transmission frequency refer to the frame number of the mirror transmission software 130 to retrieve and transmit each second, i.e. frame per second (FPS). For example, if the network status is stable, the mirror transmission software 130 retrieves and transmits 30 frames of the image frame F1 to the receiver electronic device 2 per second. On the other hand, when the network status is unstable, the mirror transmission software 130 may change to retrieve and transmit only 10 frames of the image frame F1 to the receiver electronic device 2 per second after the step S42. As such, while users may still view synchronous video at the receiver electronic device 2, the data transmission amount of the transmitter electronic device 1 is decreased to lower network burden.

Please be noted that current streaming transmission technology, usually referred to as streaming like streaming in YouTube, mainly stores complete video files on a server, uses the content of these video files as streaming content, and performs streaming transmission to play at user ends via Transmission Control Protocol (TCP) or User Datagram Protocol (UDP).

As mentioned above, in such streaming transmission technology, the playing of the video files is continuous. Therefore, when the network status is unstable, the server end firstly stores unsuccessfully transmitted image frames in registers while these unsuccessfully transmitted image frames unable to be discarded and re-transmits these image frame to the user end again. Accordingly, when the network status is unstable, the streaming content at user end may have the problem of jamming and unable to continuously play. Meanwhile, when the user uses streaming transmission, users may not able to change the resolution of the same video file unless changing streaming sources.

The present invention involves mirror transmission technology instead of aforementioned streaming transmission technology. What is played at the receiver electronic device 2 are image frames retrieved by the mirror transmission software 130 instead of directly streaming the video files in the transmitter electronic device 1 to be played by the receiver electronic device 2. Therefore, the present invention may adjust the retrieving quality of the mirror transmission software 130 to switch the resolution of the image frame F1 to be played at the receiver electronic device 2. Meanwhile, the retrieving frequency and the transmission frequency adopted by the mirror transmission software 130 may discard a portion of image frames, neither retrieving nor transmitting, to decrease data transmission amount but the receiver electronic device 2 keeps synchronous playing as the transmitter electronic device 1.

Besides, in normal application of mirror transmission, users only want to deliver screen images and audio data from a small screen device like the transmitter electronic device 1 to a large screen device like the receiver electronic device 2, but usually carry the small screen device nearby to control the screen. As mentioned above, because the mirror transmission technology, unlike streaming transmission technology that stores the streaming source at a remote server end, the present invention may stop retrieving and transmitting the audio signal A1 to solve the problem of non-continuous audio or shock-wave noises played by the receiver electronic device 2 while users may still use the transmitter electronic device 1 to hear the correct audio signal A1 without sacrificing audio effect by solving the aforementioned problems.

Figure 5:
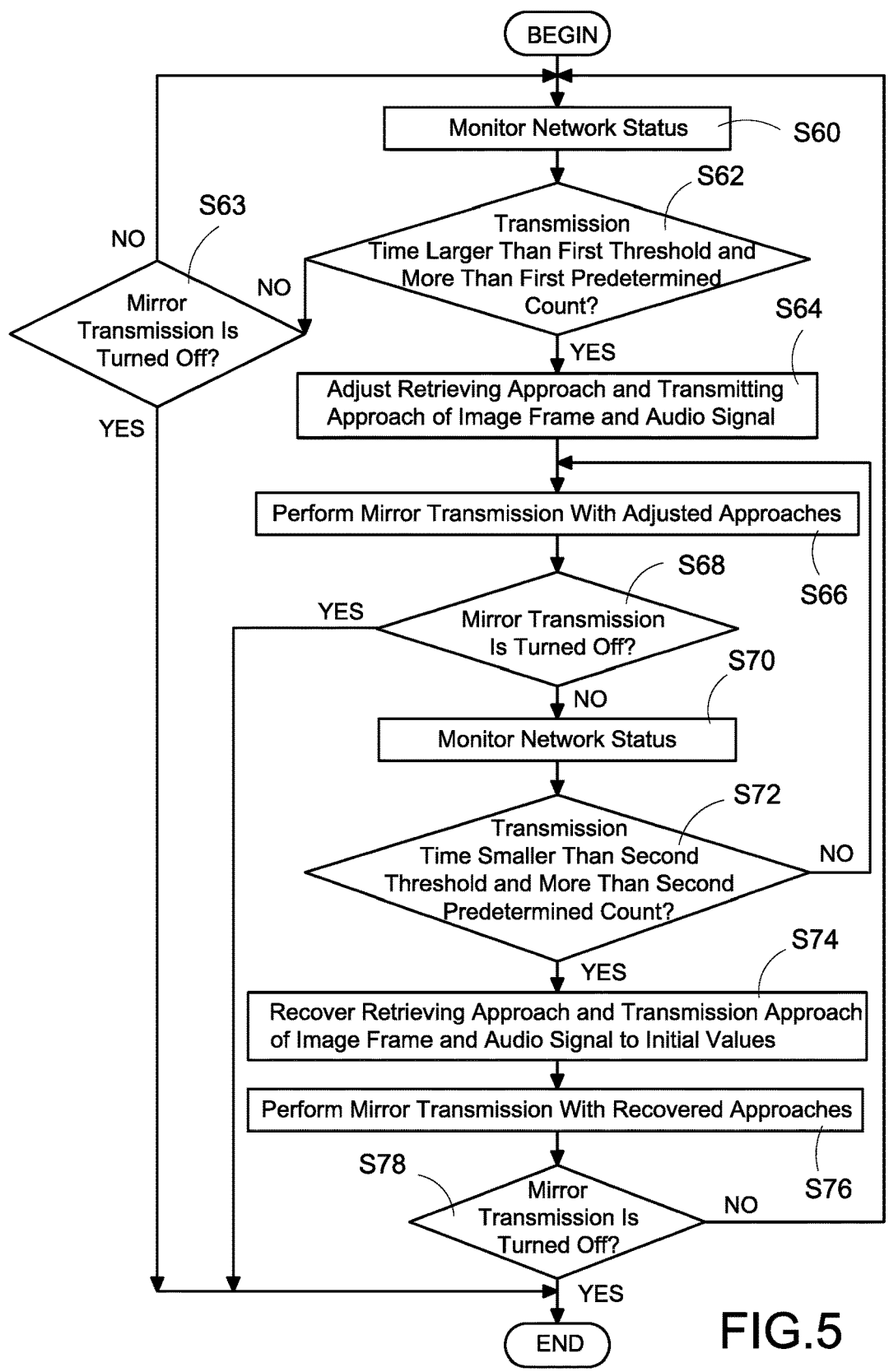
FIG. 5 is a transmission flowchart of a third embodiment according to the present invention.

Please refer to FIG. 5, which is a transmission flowchart of the third embodiment. In FIG. 5, the transmitter electronic device 1 and/or the receiver electronic device 2 continuously monitors the network status (step S60) and determines whether the network status is stable based on monitored data. In this embodiment, the transmitter electronic device 1 and/or the receiver electronic device 2 mainly determines whether a transmission time of the image frame F1 or the audio signal A1 is larger than a first threshold and more than a first predetermined count (step S62) to determine whether the network status is stable. For example, when the image frame F1 or the audio signal A1 has a transmission time larger than the first threshold like 500 ms or 700 ms and more than the first predetermined count like three or five times, the transmitter electronic device 1 and/or the receiver electronic device 2 determines that the network status is unstable.

The transmission time mainly refers to the time for transmitting the image frame F1 or the audio signal A1 from the transmitter electronic device 1 to the receiver electronic device 2 and for receiving a response message replied by the receiver electronic device 2. However, this is used as an example, instead of limiting the invention scope.

If the transmission time is not larger than the first threshold or does not exceed the first predetermined count, it further determines whether the mirror transmission function is turned off (step S63) and continuously monitors the network status (step S60) before the mirror transmission function is turned off.

If the transmission time is larger than the first threshold and exceeds the first predetermined count, the mirror transmission software 130 uses the aforementioned step S34 to step S42 to adjust the retrieving approach and the transmission approach of the image frame F1 and the audio signal A1 (step S64) and uses the adjusted approaches to perform mirror transmission afterward (step S66). Specifically, the step S66 uses at least one of adjusted retrieving quality, adjusted frequency, and the transmission frequency to transmit the image frame F1 and neither retrieves nor transmits the audio signal A1.

After the step S66, the transmitter electronic device 1 and/or the receiver electronic device 2 still determines whether the mirror transmission function is turned off (step S68) and continuously monitors the network status before being turned off (step S70). Next, the network status is determined whether being recovered stable based on monitored data. In this embodiment, the transmitter electronic device 1 and/or the receiver electronic device 2 mainly determines whether the transmission time of the image frame F1 or the audio signal A1 is smaller than a second threshold and more than a second predetermined count (step S72) to determine whether the network status is recovered stable. Specifically, when the image frame F1 or the audio signal A1 has a transmission time smaller than the second threshold like 300 ms or 500 ms and exceeds the second predetermined count like ten or twenty times, the transmitter electronic device 1 and/or the receiver electronic device 2 determines that the network status is recovered stable.

If the transmission time is not smaller than the second threshold or less than the second predetermined count, it is returned to the step S66 in which the mirror transmission software 130 continuously uses the adjusted approaches to perform mirror transmission.

If the transmission time is smaller than the second threshold and exceeds the second predetermined count, the mirror transmission software 130 recovers the retrieving approach and the transmission approach of the image frame F1 and the audio signal A1 to initial values (step S74) and uses the recovered approach to perform the mirror transmission (step S76). Specifically, the step S74 recovers the retrieving quality, the retrieving frequency and the transmission frequency to initial values and recovers retrieving and transmitting the audio signal A1 while controlling the transmitter electronic device 1 to stop playing the audio signal A1 with its audio module 12 at the same time.

After the step S76, the transmitter electronic device 1 and/or the receiver electronic device 2 continuously determines whether the mirror transmission function is turned off (step S78) and continuously monitors the network status before being turned off (step S60).

In this embodiment, the mirror transmission software 130 may stop retrieving and transmitting the audio signal A1 when determining the network status unstable. Meanwhile, the retrieving quality, the retrieving frequency and the transmission frequency are adjusted to minimum values to largely decrease data transmission amount so that the network quality may be recovered as soon as possible. However, in other embodiments, the mirror transmission software 130 may gradually and slowly adjust the retrieving quality, the retrieving frequency and the transmission frequency to avoid quick quality drop of the images played by the receiver electronic device 2 causing the users uncomfortable feeling.

Figure 6:
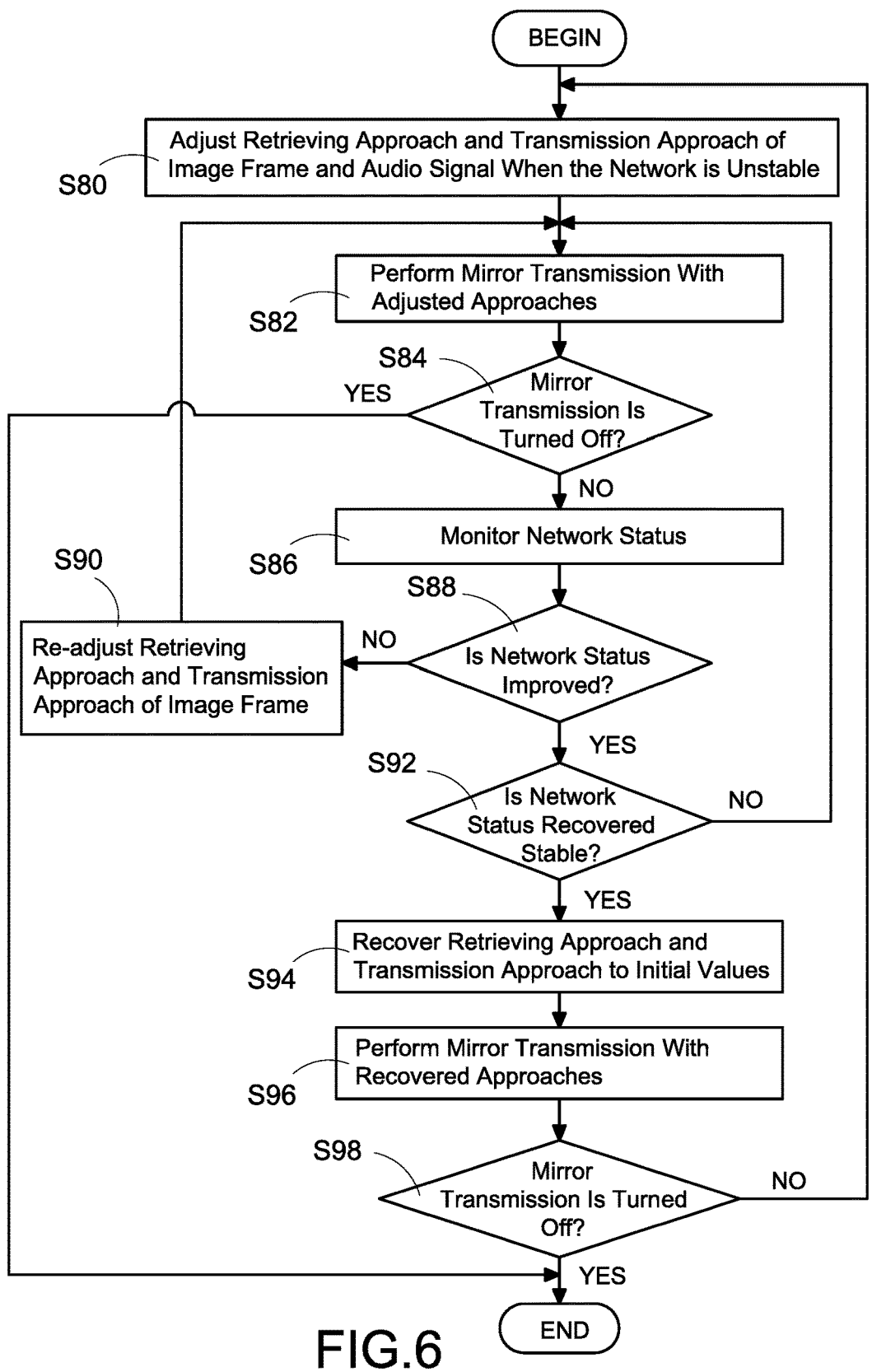
FIG. 6 is a transmission flowchart of a fourth embodiment according to the present invention.

Please refer to FIG. 6, which is a transmission flowchart of the fourth embodiment. Firstly, like the aforementioned embodiments, the transmitter electronic device 1 uses the mirror transmission software 130 to adjust the retrieving approach and transmission approach of the image frame F1 and the audio signal A1 when the network status is unstable (step S80) and uses adjusted approaches to perform mirror transmission (step S82).

After the step S82, the transmitter electronic device 1 and/or the receiver electronic device 2 determines whether the mirror transmission function is turned off (step S84) and continuously monitors the network status (step S86) before the mirror transmission function is turned off. Next, the transmitter electronic device 1 and/or the receiver electronic device 2 determines whether the network status is improved because of the step S80 (step S88). If the network status is not improved, the retrieving approach and the transmission approach of the image frame F1 is adjusted again (step S90) and it is returned to the step S82 to again use the adjusted approaches, i.e. the adjusted retrieving quality, the adjusted retrieving frequency and the adjusted transmission frequency, to perform mirror transmission.

The step S90 mainly lowers at least one of the retrieving quality, the retrieving frequency and the transmission frequency, but it is not limited to such examples. Specifically, in the first embodiment, the mirror transmission software 130 may only adjust the retrieving quality at first time, adjust the retrieving frequency at second time, and adjust the transmission frequency at the third time. In the second embodiment, the mirror transmission software 130 may adjust the retrieving quality, the retrieving frequency and the transmission frequency after each adjustment but it is not limited to these examples.

In this example, the transmitter electronic device 1 and/or the receiver electronic device 2 mainly determines whether the image frame F1 or the audio signal A1 has a shortened transmission time to further determine whether the network status is improved, but it is not limited to these examples.

If the network status is determined improved in the step S88, it is further determined whether the network status is recovered stable (step S92), i.e. whether the transmission time of the image frame F1 or the audio signal A1 is smaller than the second threshold and more than the second predetermined count. If the network status is not recovered stable yet, it is returned to the step S82. The mirror transmission software 130 continuously uses the adjusted approaches to perform mirror transmission (step S82).

If the network status is determined stable in the step S92, the mirror transmission software 130 recovers the retrieving approach and the transmission approach of the image frame F1 and the audio signal A1 to initial values (step S94) and uses the recovered approaches to perform mirror transmission (step S96). Specifically, the step S94 recovers the retrieving quality, the retrieving frequency and the transmission frequency to initial values and recovers retrieving and transmitting the audio signal A1 while controlling the transmitter electronic device 1 to stop using the audio module 12 to play the audio signal A1.

After the step S96, the transmitter electronic device 1 and/or the receiver electronic device 2 determines whether the mirror transmission function is turned off (step S98) and continuously monitors the network status (step S80) before the mirror transmission function is turned off. In addition, if the mirror transmission is turned off, it is stopped to retrieve and transmit the image frame F1 and the audio signal A1 and to disconnect the connection between the transmitter electronic device 1 and the receiver electronic device 2.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for mirror transmission used for a transmitter electronic device and a receiver electronic device wirelessly connected with a network, the method comprising:
   a) retrieving an image frame at the transmitter electronic device and sending the image frame to the receiver electronic device to be played;
   b) retrieving an audio signal from the transmitter electronic device and sending the audio signal to the receiver electronic device to be played, and controlling the transmitter electronic device to stop playing the audio signal;
   c) determining whether a status of the network being stable;
   d) stopping retrieving the audio signal at the transmitter electronic device and controlling the audio signal to be played directly at the transmitter electronic device when the network is unstable; and
   e) keeping retrieving the image frame at the transmitter electronic device and sending the image frame to the receiver electronic device to be played when the network is unstable.

2. The mirror transmission method of claim 1, wherein the step c) is performed by determining the status of the network being unstable if a transmission time of the image frame or the audio signal is larger than a first threshold time and an exceeded count is larger than a first predetermined count.

3. The mirror transmission method of claim 2, wherein the transmission time is the time for the transmitter electronic device transmitting the image frame or the audio signal to the receiver electronic device and receiving a response signal from the receiver electronic device.

4. The mirror transmission method of claim 1, further comprising:
   f) adjusting a retrieving quality and a retrieving frequency of the image frame when the status of the network is unstable;
   g) adjusting a transmission frequency for transmitting the image frame to the receiver electronic device when the status of the network is unstable; and
   h) performing the step a) according to at least one of the adjusted retrieving quality, the adjusted retrieving frequency and the adjusted transmission frequency.

5. The mirror transmission method of claim 4, further comprising:
   i) determining whether the status of the network being improved after the step h); and
   j) performing the steps from the step f) to the step h) again to re-adjust the adjusted retrieving quality, the adjusted retrieving frequency and the adjusted transmission frequency if the status of the network is not improved.

6. The mirror transmission method of claim 4, further comprising:
   k) determining whether the status of the network being recovered stable after the step h); and
   l) recovering the adjusted retrieving quality, the adjusted retrieving frequency and the adjusted transmission frequency to an initial value when the status of the network being recovered stable.

7. The mirror transmission method of claim 1, further comprising:
   m) determining whether the status of the network being recovered stable after the step d); and
   n) controlling the transmission electronic device to stop playing the audio signal when the status of the network being recovered stable and recovering to retrieve the audio signal at the transmitter electronic device and sending the audio signal to the receiver electronic device.

8. The mirror transmission method of claim 6, wherein the step k) is performed to determine the status of the network being recovered stable when a transmission time of the image frame or the audio signal is smaller than a second threshold time and a smaller count is larger than a second predetermined count.

9. The mirror transmission time of claim 7, wherein the step m) is performed to determine the status of the network being recovered stable when a transmission time of the image frame or the audio signal is smaller than a second threshold time and a smaller count is larger than a second predetermined count.

10. The mirror transmission method of claim 1, wherein the receiver electronic device has a display unit for playing the image frame, and the transmitter electronic device has a display module, wherein the display unit has a larger size than the display module.

11. The mirror transmission method of claim 1, wherein the receiver electronic device is electrically connected to a display device having a display unit for playing the image frame, and the transmitter electronic device has a display module, wherein the size of the display unit is larger than the size of the display module.

\* \* \* \* \*